(12) United States Patent
Kumar et al.

(10) Patent No.: US 7,673,070 B1
(45) Date of Patent: Mar. 2, 2010

(54) METHOD OF SHARING TELECOMMUNICATIONS NODE EQUIPMENT FACILITIES

(75) Inventors: Sridhar Kumar, Fremont, CA (US); Guy LaChance, San Jose, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 1149 days.

(21) Appl. No.: 10/665,809

(22) Filed: Sep. 19, 2003

Related U.S. Application Data

(60) Provisional application No. 60/455,682, filed on Mar. 17, 2003.

(51) Int. Cl.
*G06F 15/16* (2006.01)
*G06F 15/177* (2006.01)

(52) U.S. Cl. .................. 709/245; 709/201; 709/202; 709/203; 709/208; 709/209; 709/210; 709/220; 709/221; 709/249

(58) Field of Classification Search .......... 709/201–203, 709/208–210, 220, 221, 249, 245
See application file for complete search history.

(56) References Cited

U.S. PATENT DOCUMENTS

| | | | | |
|---|---|---|---|---|
| 4,074,072 A * | 2/1978 | Christensen et al. | ......... | 370/388 |
| 4,855,903 A * | 8/1989 | Carleton et al. | ............. | 709/248 |
| 5,353,412 A * | 10/1994 | Douglas et al. | ............. | 709/243 |
| 5,561,768 A * | 10/1996 | Smith | .......................... | 712/13 |
| 5,566,342 A * | 10/1996 | Denneau et al. | ............... | 712/11 |
| 6,115,549 A * | 9/2000 | Janis et al. | ................... | 717/172 |
| 6,434,612 B1 * | 8/2002 | Hughes et al. | ............. | 709/223 |
| 6,597,689 B1 * | 7/2003 | Chiu et al. | ................... | 370/354 |
| 6,611,522 B1 * | 8/2003 | Zheng et al. | ........... | 370/395.21 |
| 6,701,360 B1 * | 3/2004 | Diesing et al. | .............. | 709/223 |
| 6,876,660 B1 * | 4/2005 | Hughes et al. | ........... | 370/395.4 |
| 6,907,039 B2 * | 6/2005 | Shen | .......................... | 370/400 |
| 6,931,395 B2 * | 8/2005 | Day et al. | ....................... | 707/3 |
| 6,954,798 B2 * | 10/2005 | Eastham | ..................... | 709/238 |
| 7,016,379 B2 * | 3/2006 | Falkenstein et al. | ......... | 370/535 |
| 7,065,072 B1 * | 6/2006 | Quiles et al. | ................. | 370/352 |
| 7,113,484 B1 * | 9/2006 | Chapman et al. | ............ | 370/252 |
| 7,149,220 B2 * | 12/2006 | Beukema et al. | ............ | 370/394 |
| 7,249,189 B2 * | 7/2007 | Refai et al. | .................. | 709/230 |
| 7,263,097 B1 * | 8/2007 | Ornes et al. | ................. | 370/386 |
| 7,444,398 B1 * | 10/2008 | Matthews | .................... | 709/224 |
| 2001/0037435 A1 * | 11/2001 | Van Doren | .................... | 711/153 |
| 2002/0057709 A1 * | 5/2002 | Edmon et al. | ................ | 370/442 |
| 2002/0069369 A1 * | 6/2002 | Tremain | ..................... | 713/201 |
| 2002/0103921 A1 * | 8/2002 | Nair et al. | .................... | 709/232 |
| 2002/0129127 A1 * | 9/2002 | Romero et al. | .............. | 709/220 |
| 2003/0058854 A1 * | 3/2003 | Cote | .......................... | 370/389 |
| 2003/0103500 A1 * | 6/2003 | Menon et al. | ................ | 370/389 |
| 2003/0188220 A1 * | 10/2003 | Misra et al. | ..................... | 714/6 |
| 2003/0200073 A1 * | 10/2003 | Rich et al. | ..................... | 703/17 |
| 2003/0236852 A1 * | 12/2003 | Fernandes et al. | ........... | 709/215 |
| 2004/0123035 A1 * | 6/2004 | Gilbert | ........................ | 711/128 |
| 2004/0139368 A1 * | 7/2004 | Austen et al. | ................ | 714/20 |
| 2005/0147027 A1 * | 7/2005 | Hyytiainen | ................. | 370/216 |

* cited by examiner

*Primary Examiner*—Kenny S Lin
*Assistant Examiner*—Hieu T Hoang
(74) *Attorney, Agent, or Firm*—Townsend and Townsend and Crew

(57) ABSTRACT

The present invention generally relates to providing a plurality of logical nodes in a telecommunications node. A plurality of control processors are configured to manage data routing paths for the logical nodes. Each logical node can be associated with a different entity.

10 Claims, 4 Drawing Sheets

METHOD OF SHARING TELECOMMUNICATIONS NODE EQUIPMENT FACILITIES

CROSS-REFERENCES TO RELATED APPLICATIONS

The present application is a non-provisional of and claims priority from U.S. Provisional Application No. 60/455,682, filed Mar. 17, 2003, the entire contents of which are herein incorporated by reference for all purposes.

BACKGROUND OF THE INVENTION

The present invention generally relates to telecommunication equipment and more specifically to apparatus and methods for providing a plurality of logical telecommunication nodes in a telecommunication node.

A telecommunications node is designed to facilitate connections between two or more network end devices. The end devices may be devices such as telephones, computers, point of sale terminals, and other similar or related equipment. The end devices may be directly connected to the node or may be attached to other equipment that is subsequently connected to the node.

A telecommunications node is typically made from several components or subassemblies. For example, a telecommunications node includes a shelf with several slots for data processors that transfer data for the connections. Also, the data processors are controlled by a single control processor that manages the connections that are transferring data through the data processors.

A single telecommunications node is typically associated with one service provider. A service provider includes any entity that transfers data using the telecommunication node. Thus, the data transferred through the telecommunications node is associated with only that service provider. When the service provider does not transfer enough data in order to fully use the data processors in the telecommunications node, the node is not being used efficiently because data from other service providers cannot be transferred by the unused data processors.

Also, because a single control processor is typically found in one slot of the telecommunications node, it is not possible to use multiple control processors for the data processors. Typically, the control processor can only manage connections for a single service provider; thus, the telecommunications node is limited to processing data for a single service provider.

BRIEF SUMMARY OF THE INVENTION

Embodiments of the present invention relate to providing a plurality of logical nodes in a telecommunications node. A plurality of control processors are configured to manage data routing paths for the logical nodes. Each logical node can be associated with a different entity.

In one embodiment, a telecommunications device for processing data is provided. The device includes a plurality of data processors. The device comprises: a plurality of control processors, each control processor configured to manage data routing paths for routing data between data processors in the plurality of data processors; and a plurality of logical nodes, wherein each logical node includes one or more data processors in the telecommunications device and is associated with a control processor in the plurality of control processor, wherein a logical node routes data using the one or more data processors included in the logical node according to the data routing paths for routing data associated with each logical data processor.

In another embodiment, a telecommunications shelf including a plurality of slots configured to connect to data processors is provided. The shelf comprises: a first logical shelf including a first set of one or more data processors, wherein each data processor in the first set is connected to a first set of one or more slots in the plurality of slots; and a second logical shelf including a second set of one or more data processors, wherein each data processor in the second set is connected to a second set of one or more slots in the plurality of slots, wherein the first logical shelf is associated with a first entity that transfers data using the first set of one or more data processors and second logical shelf is associated with a second entity that transfers data using the second set of one or more data processors.

In yet another embodiment, a method for routing data using a telecommunications device that includes a plurality of data processors is provided. The method comprises: configuring a first set of one or more data processors in the plurality of data processors for a first logical node in the telecommunications device; configuring a second set of one or more data processors in the plurality of data processors for a second logical node in the telecommunications device; receiving data associated with a first entity; routing the data using the one or more data processors in the first logical node; receiving data associated with a second entity; and routing the data using the one or more data processors in the second logical node.

A further understanding of the nature and advantages of the invention herein may be realized by reference of the remaining portions in the specifications and the attached drawings.

DETAILED DESCRIPTION OF THE INVENTION

Figure 1:
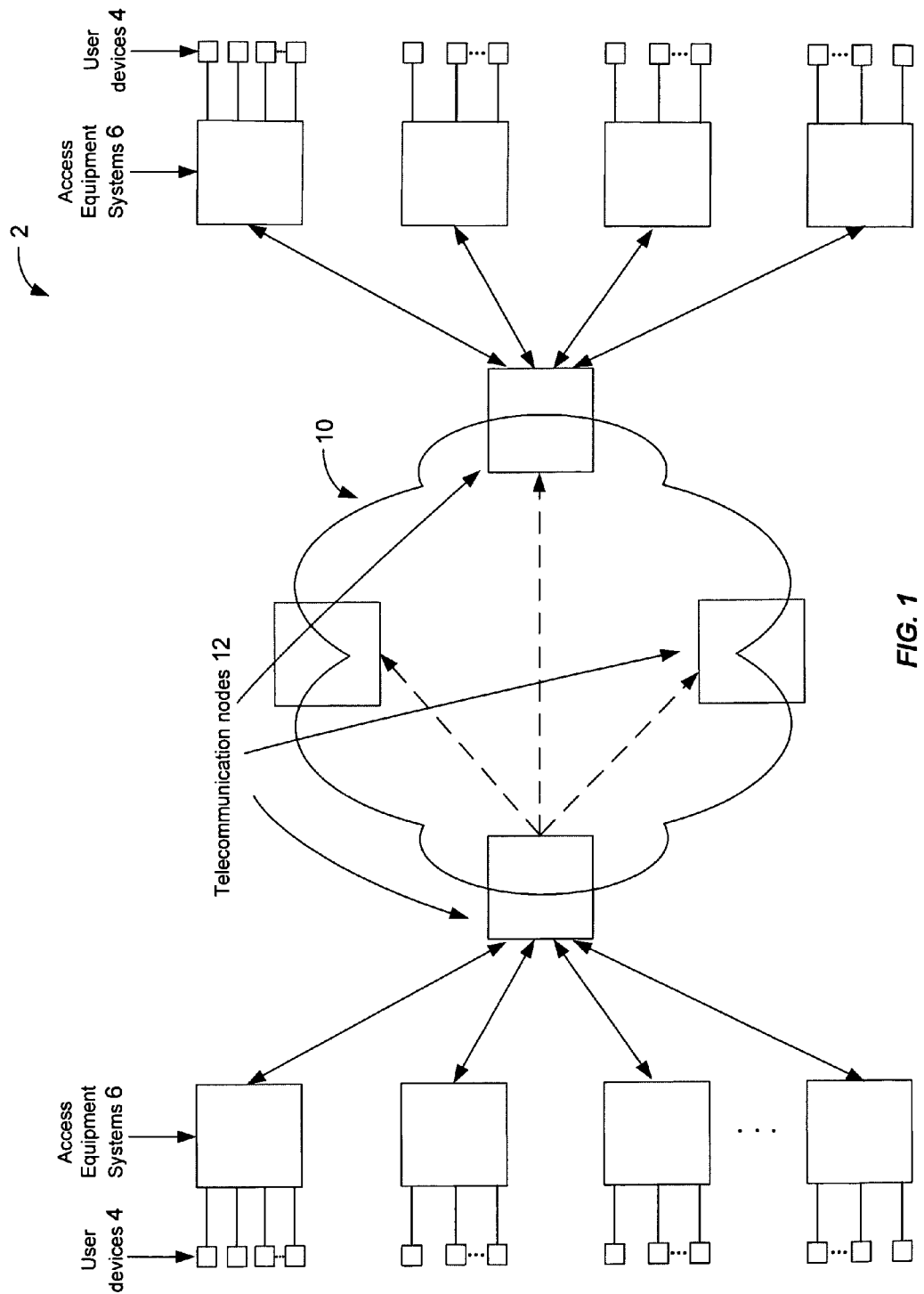
FIG. 1 depicts a simplified block diagram of a telecommunications system according to one embodiment of the present invention.

FIG. 1 depicts a simplified block diagram of a telecommunications system 2 according to one embodiment of the present invention. Telecommunications system 2 includes user devices 4, access equipment systems 6, a network 10, and telecommunication nodes 12.

User devices 4 are computing devices associated with users that communicate data. Examples include personal computers (PCs), customer premise equipment (CPE), user terminals and modems, workstations, personal digital assistants (PDAs), cellular phones, personal PCs, switches, servers, point of sale terminals, telephones, and the like. The data are transmitted to access equipment systems 6 through communication lines.

Access equipment systems 6 aggregate and multiplex the data received from user devices 4. Examples of access equipment systems 6 include digital subscriber line access multiplexer (DSLAM), multiplexers, etc. Data received at access equipment systems 6 are then sent to telecommunication nodes 12. Data from a single access equipment system 6 are typically sent in a specific data format and a specific data rate. For example, the data formats include SONET/SDH (OC3, OC12, OC48, etc.), DS3/E3, Ethernet, Gigabit Ethernet, etc. Data in these formats are also transferred at various data rates, where a fixed data rate is associated with a format. Also, the type of physical connection may limit the data rate in which data is transferred. For example, ATM circuits may transfer data at one rate and SONET networks may transfer data at another rate.

Telecommunication nodes 12 receive the data from access equipment systems 6. Telecommunication nodes 12 process the data in data packets and may send the data packets to one or more other telecommunications nodes 12. Although data packets are referred to, it will be recognized that data may be transferred by other means, such as analog data through a public switched telephone network (PSTN). Data packets are then sent to either another access equipment system 6 and/or to another user device 4 through network 10. Network 10 may be any network, such as the Internet, a wireless network, a wireline network, etc.

Telecommunications nodes 12 comprise switches that transfer data between entities in system 2. For example, telecommunications nodes 12 transfer data between a first user device 4 to a second user device 4.

Figure 2:
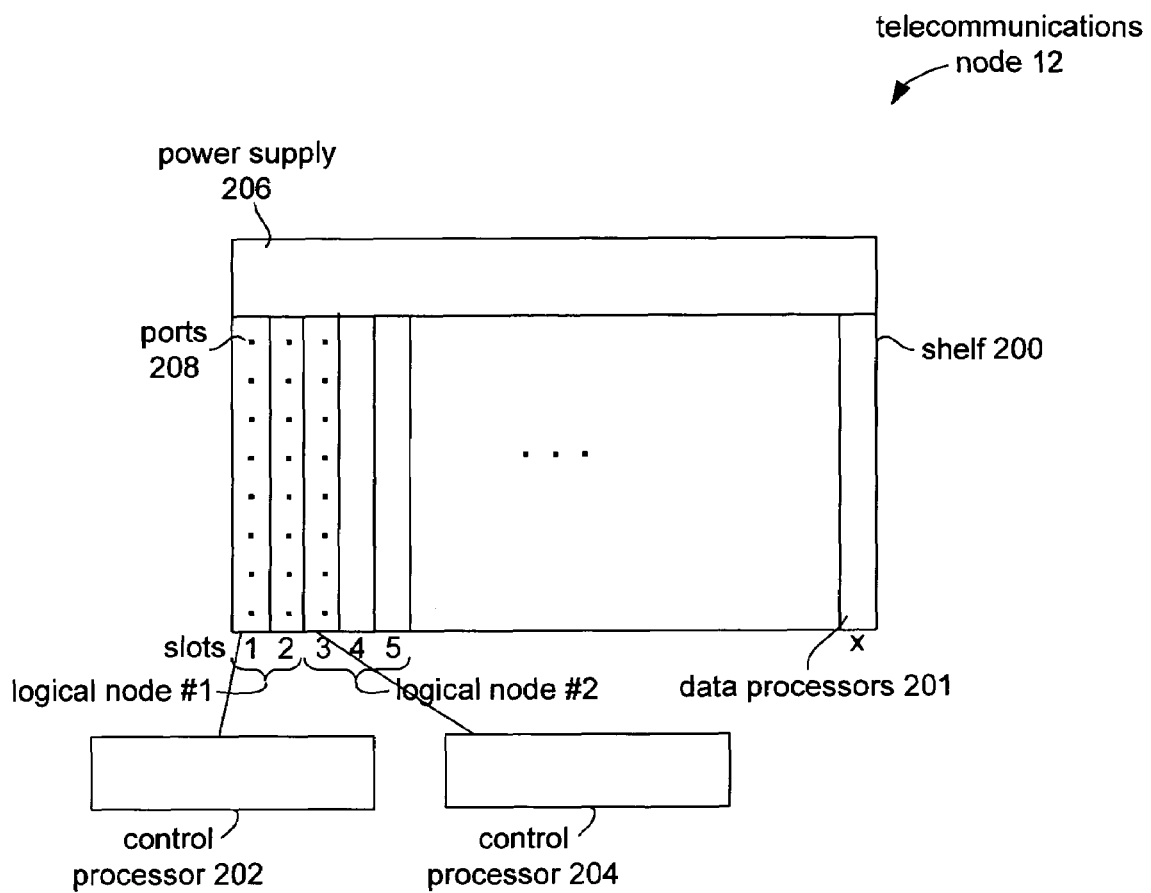
FIG. 2 depicts a simplified block diagram of a telecommunications node according to one embodiment of the present invention.

FIG. 2 depicts a simplified block diagram of a telecommunications node 12 according to one embodiment of the present invention. Telecommunications node 12 includes one or more data processors 201, a plurality of control processors depicted as control processor 202 and control processor 204, and a power supply 206. In one embodiment, a shelf 200 is a physical unit that is configured to house the one or more data processors 201.

Shelf 200 includes a plurality of slots labeled 1, 2, 3, 4, 5, . . . , X. Each slot is configured to hold a data processor 201. Additionally, shelf 200 includes an area for power supply 206. Power supply 206 is configured to power components for shelf 200. Although one power supply 206 is shown, it will be understood that any number of power supplies 206 may be used. Although control processors 202 and 204 are shown outside of shelf 200, it will be understood that control processors 202 and 204 may be included in shelf 200.

Data processors 201 include any data processor or data plane configured to transfer data. For example, data processors 201 include switching circuitry components that are included on a printed circuit board. In one embodiment, each data processor 201 includes a number of ports 208 that are used to transfer data from one port 208 to another port 208. For example, data may be transferred from a port 208 in one data processor 201 to a port 208 in the same data processor 201 or to a data processor 201 located in a different slot of shelf 200.

Control processor 202 and control processor 204 are computing devices configured to manage the connections through data processors 201. For example, data routing paths between entities are included and managed by control processor 202. A data routing path may indicate that data should be routed from a data plane 201 in a slot #1 to a data processor in a slot #2. Additionally, data routing paths may also specify ports such as route data from a data processor #1, port #2 to a data processor #2, port #4.

Within telecommunication node 12, a plurality of logical nodes are formed using one or more data planes 201. Data processors 201 may be referred to by their slot numbers. For example, a data processor in a slot #1 is referred to as "data processor #1". In one example, a logical node #1 is formed with data processors #1 and #2 and a logical node #2 is formed with data processors #3, #4, and #5. In one embodiment, a logical node is a telecommunications node in itself. For example, in shelf 200, each logical node can transfer data for a different service provider. Thus, multiple service provider may transfer data through telecommunication node 12. Each logical node is associated with a control processor, as shown, control processor 202 is associated with logical node #1 and control processor 204 is associated with logical node #2.

As shown, a logical node #2 does not start at a physical slot #1. Data routing paths may be generated assuming that the logical node starts at slot #1. Control processor 204 is configured to determine how to route data between data processors 201 in logical node #2. Conventionally, if a telecommunications node included all slots in shelf 200, data routing paths for transferring data from a first data processor to a second data processor by slot number were easily configured by a control processor. However, in embodiments of the present invention, because a logical node may begin at any slot number, a control processor is configured to determine how to route data based on data routing paths that may assume a shelf 200 includes a single telecommunications node 12 and data routing paths start at a physical slot #1. For example, routing paths may specify that data should be routed from a data processor found in slot #1 to a data processor found in slot #2. If this routing path is used for routing data in logical node #1, no translation is necessary because the data processors are located in slots #1 and #2 for logical node #1. Data can be routed from data processor #1 to data processor #2 as the data routing path indicates. However, for logical nodes that do not start at slot #1, a control processor is configured to map the data routing path to the slot numbers for the data processors found in the logical node. For example, control processor 204 may route the source of the data routing path from data processor #1 to data processor #3 and the destination from data processor #2 to data processor #4.

Figure 3:
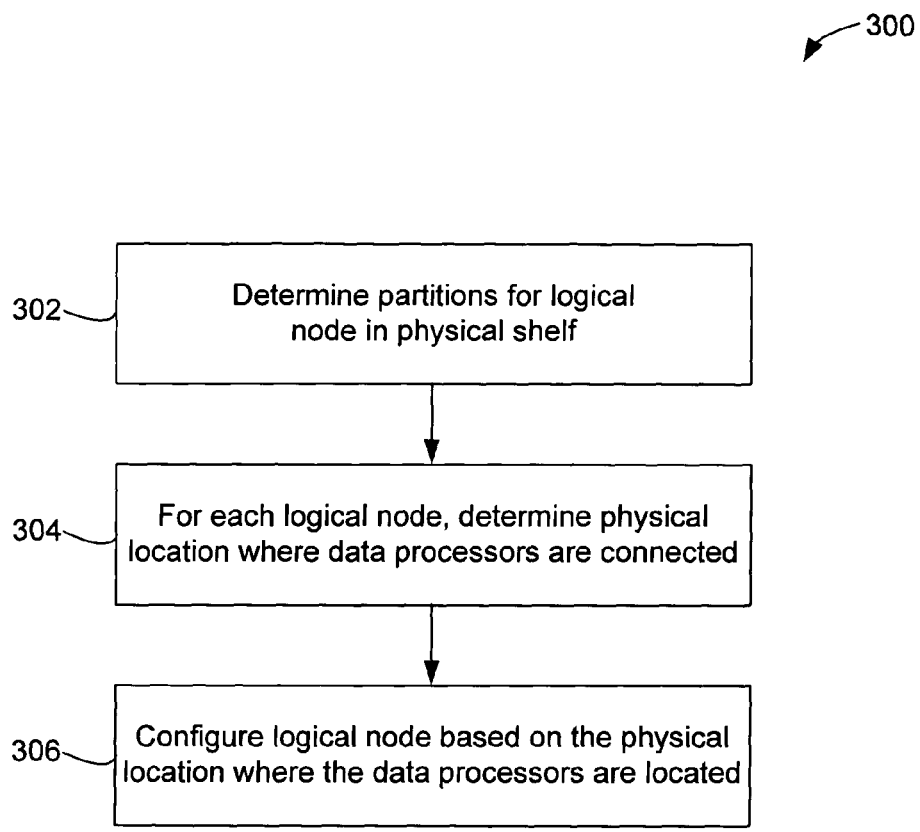
FIG. 3 illustrates a flow chart and a method for partitioning logical nodes in shelf according to one embodiment of the present invention.

FIG. 3 illustrates a flow chart 300 and a method for partitioning logical nodes in shelf 200 according to one embodiment of the present invention. In step 302, partitions for logical nodes in shelf 200 are determined. A logical node may include one or more data processors 201 in shelf 200. Each logical node may have its own data processors 201, however, it will be understood that a logical node may share one or more data processors 201. The partitions will include data processors 201 found in certain slots, such as slots #1-2 for a first logical node and slots #3-5 for a second logical node.

In step 304, for each logical node determined, the physical locations in shelf 200 for data processors 201 in each logical node are determined. For example, for logical node #1 in FIG. 2, data processors #1 and #2 are found in slots #1 and #2. And for logical node #2, data processors #3, #4, and #5 are found in slots #3-5.

In step 306, each logical node is configured based on the physical location where its data processors are located. For example, a logical node is configured in that a control processor is configured to translate data routing paths based on its associated data processors. For example, if all data routing paths are based on a telecommunications node starting at a slot #1 in shelf 200, a control processor for a logical node that does not start at slot #1 is configured to map data routing paths to the physical locations of its data processors 201 in the physical slot numbers.

In one embodiment, each control processor includes a physical connection to a data processor 201 in shelf 200. From the connections, a control processor can determine the first data processor 201 in its logical node. For example, the control processor may be connected to the first data processor 201 in its logical node. Each control processor is configured to assume that the first data processor in the logical node is like a data processor 201 in the first slot. Thus, when a data routing path that assumes that data processors start at a first slot is encountered, the control processor maps the source of the data routing path to the first data processor that it is connected to and then maps the destination to a corresponding data processor in its logical node.

Figure 4:
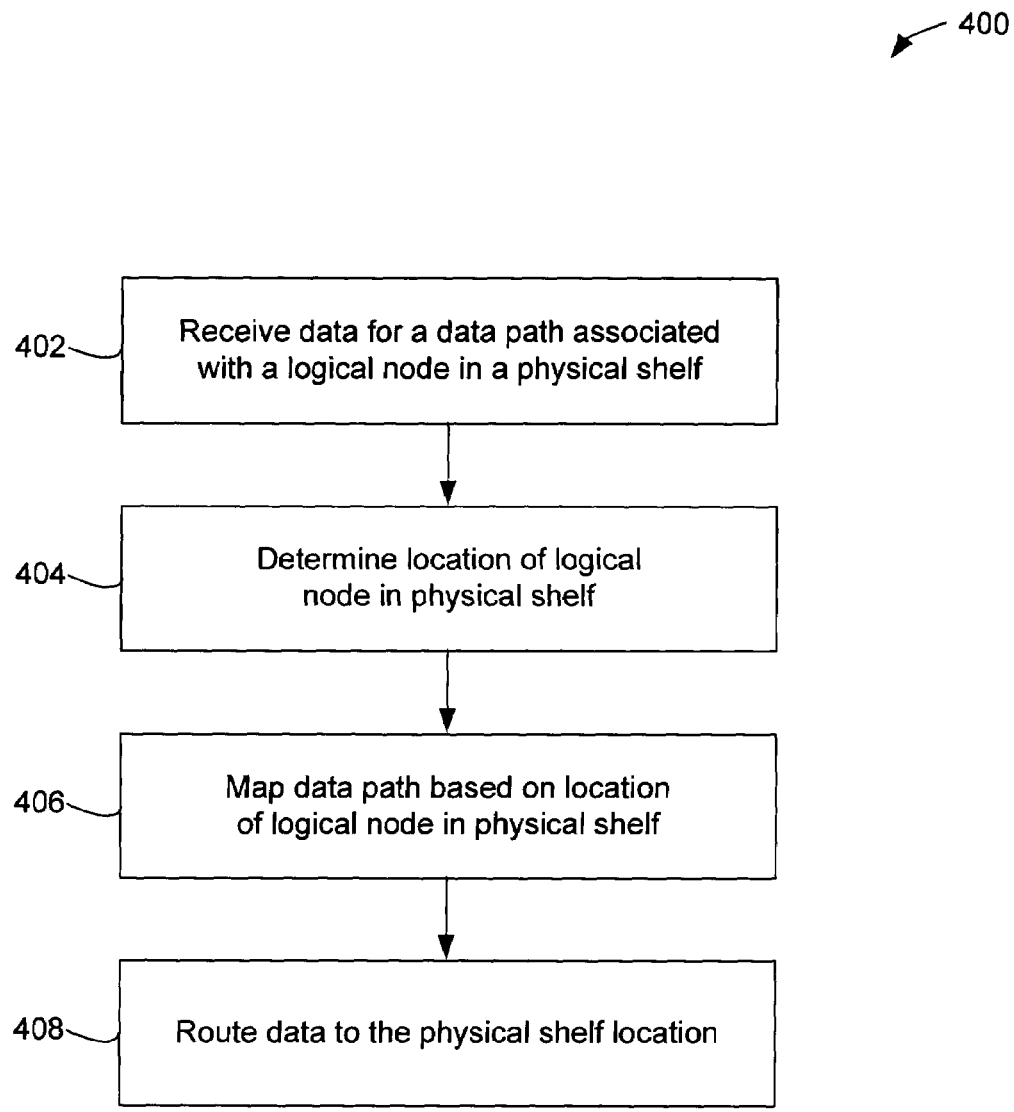
FIG. 4 illustrates a simplified flow chart of a method for transferring data for a logical node according to one embodiment of the present invention.

Once the logical nodes are partitioned, data is transferred for each logical node. FIG. 4 illustrates a simplified flow chart 400 of a method for transferring data for a logical node according to one embodiment of the present invention. In step 402, data is received for a data routing path associated with a logical node in shelf 200. The received data routing path may specify that data should be routed from a first data processor in a first slot number to a second data processor in a second slot number.

In step 404, a location of a logical node in shelf 200 is determined. For example, a logical node may include the data processors 201 found in slots #3-5 of shelf 200. The physical location (e.g., the slot numbers of data processors 201 for the logical node) is determined in shelf 200. Because each logical node does not start at slot #1, a location is determined in order to map data routing paths to the location of the logical node in shelf 200.

In step 406, the data routing path is mapped based on the location of the logical node in shelf 200. For example, if the data routing path is from a data processor #1 in slot #1 to a data processor #2 in slot #2, the data routing path may be mapped to a data processor #3 in slot #3 to a data processor #4 in slot #4 if logical node #2 of FIG. 2 is used. Thus, a data routing path that specifies that data should be routed from a first data processor in slot #1 to a second data processor in slot #2 is rerouted to the first and second data processors in a logical node #2. These data processors are not the first and second data processors in the first and second physical slots of shelf 200 but are the first and second data processors in the logical node.

In step 408, the data is routed to the determined physical shelf location according to the data routing path. In the above example, the data will be routed from data processor #3 to data processor #4.

Accordingly, embodiments of the present invention enable multiple logical nodes to be created in a telecommunication node. Thus, a physical shelf can include multiple telecommunication nodes and each telecommunication node can be associated with a different entity. Also, a control processor is associated with each logical shelf and each control processor is configured to map data routing paths to the physical location of data processors in the logical node.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A telecommunications device for processing packet data received over a communications network, wherein the telecommunications device includes a plurality of data processors, the telecommunications device comprising:

a plurality of control processors, each control processor configured to manage data routing paths between data processors in the plurality of data processors according to the corresponding physical locations of the data processors in the telecommunications device; and a plurality of logical nodes, wherein each logical node includes two or more data processors in the telecommunications device and is associated with a control processor in the plurality of control processors such that each control processor is coupled to a first data processor of its associated logical node and manages data routing paths within the logical node in relation to said first data processor; and a plurality of physical slots, wherein each physical slot is coupled to a data processor in the plurality of data processors;

wherein a data routing path from a first physical slot location to a second physical slot location in the telecommunications device is mapped to a data routing path from a third physical slot location to a fourth physical slot location; and wherein each logical node is associated with a distinct network service provider and routes data for the network service provider using the one or more data processors included in the logical node according to the data routing paths.

2. The telecommunications device of claim 1, further comprising a power source configured to power the plurality of logical nodes.

3. The telecommunications device of claim 1, wherein the packet data is formatted according to the OC3, OC12, OC48, Ethernet, or Gigabit Ethernet protocols.

4. A telecommunications shelf for sending packet data to destinations on a communications network, the telecommunications shelf comprising:

a plurality of slots configured to connect to data processors, wherein each slot is associated with a slot position;

a first logical shelf including a first set of two or more data processors, wherein each data processor in the first set is connected to a first set of one or more slots in the plurality of slots;

a second logical shelf including a second set of two or more data processors, wherein each data processor in the second set is connected to a second set of one or more slots in the plurality of slots;

a first control processor separate from the first set of the data processors configured to manage data routing paths between the data processors of the first set according to their corresponding slot positions in the first logical shelf; and a second control processor separate from the second set of data processors configured to manage data routing paths between the data processors of the second set according to their corresponding slot positions in the second logical shelf;

wherein the first control processor is configured to map data routing paths based on the slot locations of the data processors in the first set of data processors;

wherein the second control processor is configured to map data routing paths based on a physical location of the data processors in the second set of data processors; and wherein the first logical shelf is associated with a first network service provider that transfers data using the first set of data processors and the second logical shelf is associated with a second network service provider that transfers data using the second set of data processors.

5. The telecommunications shelf of claim 4, wherein the first control processor is configured to manage data routing paths for the first entity and the second control processor is configured to manage data routing paths for the second entity.

6. The telecommunications shelf of claim 4, further comprising a power source configured to provide power to the first and second set of data processors in the first and second logical shelves.

7. A method for routing packet data over a communication network using a telecommunications device that includes a plurality of data processors, the method comprising:
   configuring a first set of two or more data processors in the plurality of data processors for a first logical node in the telecommunications device;
   configuring a second set of two or more data processors in the plurality of data processors for a second logical node in the telecommunications device;
   managing routing paths within the first logical node with a first control processor distinct from the first set of data processors;
   managing routing paths within the second logical node with a second control processor distinct from the second set of data processors;
   receiving data associated with a first network service provider, comprising receiving data for a first routing path from a first location to a second location in the telecommunications device and determining a first mapping of the first control processor for routing the data from a third location to a fourth location in the telecommunications device;
   routing the data associated with the first network service provider between data processors of the first logical node according to the first mapping of the first control processor;
   receiving data associated with a second network service provider; and
   routing the data associated with the second network service provider between data processors of the second logical node according to a second mapping of the second control processor.

8. The method of claim 7,
   wherein routing the data associated with the first network service provider comprises routing the data from a data processor in the third location to a data processor in the fourth location, the third and fourth data processors included in the first set of data processors.

9. The method of claim 8, wherein receiving data associated with the second network service provider comprises receiving data for a second routing data path from a fifth location to a sixth location in the telecommunications device, and further comprising:
   determining a seventh and eighth location in the telecommunications device in which to route the data associated with the second network service provider,
   wherein routing the data associated with the second network service provider comprises routing the data from a data processor in the seventh location to a data processor in the eight location, the seventh and eighth data processors included in the second set of data processors.

10. The method of claim 7, wherein the first control processor manages data routing paths for the first network service provider and the second control processor manages data routing paths for the second network service provider.

\* \* \* \* \*